(12) United States Patent
Cameron et al.

(10) Patent No.: US 7,316,257 B2
(45) Date of Patent: Jan. 8, 2008

(54) PORTABLE SCREEN ASSEMBLY

(76) Inventors: Ronald A. Cameron, 334 Hazel Dr., Schaumburg, IL (US) 60193; Yvonne Marsh, 12 Carthew St., Okato, Taranaki (NZ)

( * ) Notice: Subject to any disclaimer, the term of this patent is extended or adjusted under 35 U.S.C. 154(b) by 555 days.

(21) Appl. No.: 10/396,592

(22) Filed: Mar. 25, 2003

(65) Prior Publication Data
US 2004/0188041 A1 Sep. 30, 2004

(51) Int. Cl.
*A47G 5/00* (2006.01)
(52) U.S. Cl. .................... 160/351; 359/443
(58) Field of Classification Search ........... 160/24, 160/351, 369, 368.1, 371, 387, 405; 359/443; 40/610, 603, 607.01
See application file for complete search history.

(56) References Cited

U.S. PATENT DOCUMENTS

| 2,845,244 | A | * | 7/1958 | Prokop | 248/171 |
|---|---|---|---|---|---|
| 2,888,072 | A | * | 5/1959 | Nicholas | 160/377 |
| 3,166,115 | A | * | 1/1965 | Riedel | 160/24 |
| 3,205,772 | A | * | 9/1965 | Gusske | 359/461 |
| 3,309,049 | A | * | 3/1967 | Albee | 248/171 |
| 3,592,255 | A | | 7/1971 | Potter et al. | |
| 3,841,594 | A | | 10/1974 | Zinn | |
| 3,868,078 | A | | 2/1975 | Zinn | |
| 3,942,869 | A | * | 3/1976 | Portner et al. | 359/443 |
| 4,017,152 | A | * | 4/1977 | Allen | 359/443 |
| 4,068,921 | A | | 1/1978 | Okumura | |
| 4,110,003 | A | | 8/1978 | Zinn | |
| 4,317,553 | A | | 3/1982 | Meinunger | |
| 5,581,401 | A | | 12/1996 | Takamoto et al. | |
| 6,052,227 | A | | 4/2000 | Niwa et al. | |
| 6,182,740 | B1 | * | 2/2001 | Pfaff | 160/351 |
| 6,191,886 | B1 | | 2/2001 | Sinkoff | |
| 6,249,377 | B1 | | 6/2001 | Takamoto et al. | |

* cited by examiner

*Primary Examiner*—David Purol
(74) *Attorney, Agent, or Firm*—Law Office of Marc. D. Machtinger, Ltd.

(57) ABSTRACT

A portable screen assembly which is easily assembled and highly compact when disassembled is provided. The assembly includes a collapsible base having at least three leg members and a central support pole. The assembly includes top and bottom frame members in parallel relation supported via the central support pole supporting a screen. The screen is held in place with the frame members via flaps, sleeves, or hooks and eyelets, and is completely removable and preferably wrinkle resistant. Side supports are optionally included to provide additional support for the top and bottom frame members. The frame members and side supports are optionally telescoping members or frictionally fitting or threaded separable members. The top portion of the central support pole preferably includes a top cap which is part of a mounting mechanism for mounting the top frame member. In the preferred embodiment, the mounting mechanism allows for keystoning of the screen.

9 Claims, 10 Drawing Sheets

PORTABLE SCREEN ASSEMBLY

TECHNICAL FIELD

The present invention relates to a portable screen assembly, and more specifically, to a portable screen assembly that is convenient, quickly assembled, and compact when disassembled.

BACKGROUND OF THE INVENTION

Portable screen assemblies are well known and widely used. Assembly is typically tedious, involving setting up a stand and unrolling the projection screen. Such assemblies typically need to provide a sizable viewing area for projection equipment, and as a result are generally large and bulky and do not to break down to a very compact size. When fully assembled, the projection screen is seldom completely perpendicular with the image cast on it by projection equipment. Consequently, the image being displayed is distorted. Furthermore, conventional portable projection screen assemblies tend to lack sturdiness.

Various attempts have been made to address some of these deficiencies. U.S. Pat. No. 3,205,772 issued to Guske discloses a portable screen assembly with a keystone eliminator for relieving distortion of the image shown on the screen. Such distortion is a result of the projected image being cast on the projection screen at an angle of incidence of more or less than 90°. Linear distortion such as this can be eliminated by correcting the angle of the screen so that the projected image is cast at approximately a right angle to the screen. This notch and hook form of keystone eliminating device provides relief for keystoning effects on roller mounted screens only.

U.S. Pat. No. 4,068,921 issued to Okumura discloses a projector screen mounted on rollers and which has a support means that can be stored within the rollers. Such a device cannot be stored compactly, and is bulky and impractical.

Several deficiencies are common to the above attempts to provide a tilting screen that eliminates distortion of the image cast on a portable projection screen. The tilting mechanism in the above designs eliminates distortion on screens that are mounted on a roller device. Projector assemblies that do not include roller mounted screens do not benefit from this design.

U.S. Pat. No. 3,942,869 issued to Portner discloses a projection screen unit with cross rods attached to a central pole considerably near the center of the projection screen. The projection screen has the capability to be tilted thus eliminating distortion on the screen. However, the support for this projection screen assembly does not provide a means by which to tilt the screen.

U.S. Pat. No. 4,317,553 issued to Helmut Meinunger, discloses a stand with a guide body which moves up a central post providing for angular displacement of the legs. The guide body holds the legs in place when set to the desired position. However, the device cannot be collapsed very compactly.

U.S. Pat. No. 4,017,152 issued to Allen discloses a portable projection screen with a central hub member that has multiple extensible-contractible rods which radiate outwardly from it. The rods attach to the screen at the corners of the screen. This design is complicated to assemble.

U.S. Pat. No. 3,592,255 issued to Potter et al. discloses a projector screen that hangs vertically from a ceiling or wall. This design incorporates an extended stretch arm to keep the screen open for use. Such a design is impractical with respect to portability.

U.S. Pat. No. 4,110,003 issued to Zinn discloses a projector screen mounted on rollers and which has a support means that can be stored within the rollers. Such rollers do not collapse compactly.

U.S. Pat. No. 6,249,377 discloses a projection screen unit with support rails which keep two separate frames apart during use. One frame has a screen fixedly mounted to it while the second frame is rotatably mounted to a spring-biased roll attached to the projection screen. When collapsed, the projection screen winds around the roll attached to the second frame, and is thus not very compact.

U.S. Pat. No. 5,581,401 issued to Takamoto et al. discloses yet another projector screen mounted on rollers and which has a support means that can be stored within the rollers. The mechanism disclosed by Takamoto includes legs which hold the projector screen in place when in a full viewing position.

Similarly, U.S. Pat. No. 6,191,886 issued to Sinkoff discloses a video projection screen assembly which has a roller mounted screen attached to a support assembly with one or more gas spring arms for opening the screen when expanded from its collapsed position. The support assembly in this design is not removably attached to the screen.

Likewise, U.S. Pat. No. 3,841,594 issued to Zinn discloses a collapsible roller mounted projection screen. The screen, when fully collapsed, must still be stored in an area at least as large as the width of the projector screen itself.

In each of the above attempts to provide a compact design for a projector screen assembly, a common problem exists. In each of the above instances, the roller mounted projector screen assembly must maintain the overall width of the screen when broken down into its compact portable state.

It would be advantageous to provide a portable screen assembly that can be erected quickly and easily, has the ability to tilt the angle of the screen to eliminate distortion of the image being displayed, and can be packed into a small case for ease in mobility.

SUMMARY

In view of the insufficiencies discussed above, it is an object of the present invention to provide a portable projector screen which has a keystoning mechanism for eliminating distortion of a projected image when shown on the projector screen.

It is another objective of the present invention to provide a portable screen assembly which has a sturdy base which securely holds the projection screen in place for viewing.

It is yet another objective of the present invention to provide a portable projector screen that can be assembled with ease in a relatively minimal amount of time.

It is a further objective of the present invention to provide a portable projector screen that is mobile and can readily fit into luggage for travel.

In accordance with the above objectives, the present invention is a portable screen assembly. The assembly includes a collapsible base having at least three leg members hingedly attached to a central support pole. The leg members are selectively outwardly pivotable to form a base of support.

The assembly includes top and bottom frame members in parallel relation supported via a central support pole supporting a screen. The screen is held in place with the frame members via flaps, sleeves, or hooks and eyelets, and is completely removable and preferably wrinkle resistant.

Side supports are optionally included to provide additional support for the top and bottom frame members.

The frame members and side supports are optionally telescoping members or frictionally fitting or threaded separable members. If separable, the pieces are preferably kept in association with one another via a central cord running through one of such members. The cord preferably has end elements which hold the pieces together.

The top portion of the central support pole preferably includes a top cap which is part of a mounting mechanism for mounting the top frame member. In the preferred embodiment, the mounting mechanism allows for keystoning of the screen.

Other features and advantages of the invention will be apparent from the following detailed description taken in conjunction with the following drawings.

DETAILED DESCRIPTION

Figure 1:
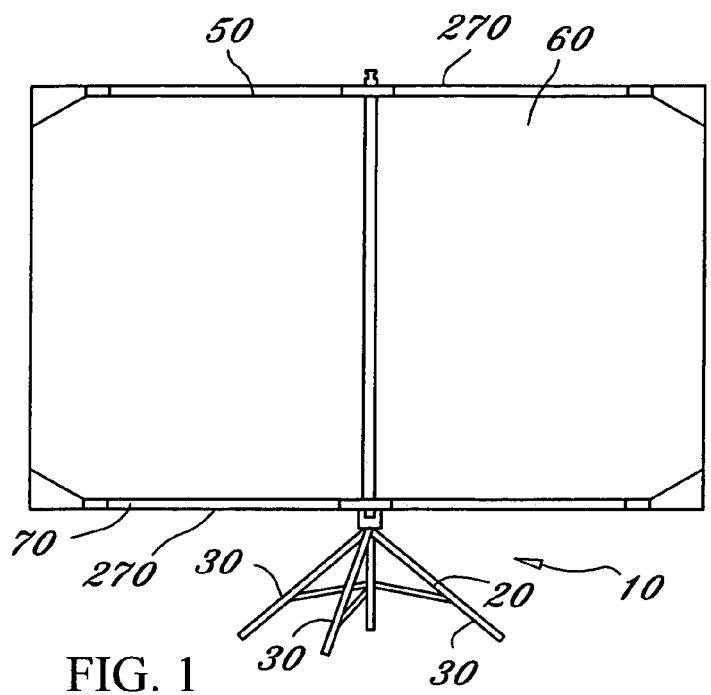
FIG. 1 is a rear view of a preferred embodiment of the projection screen of the present invention.
Figure 2:
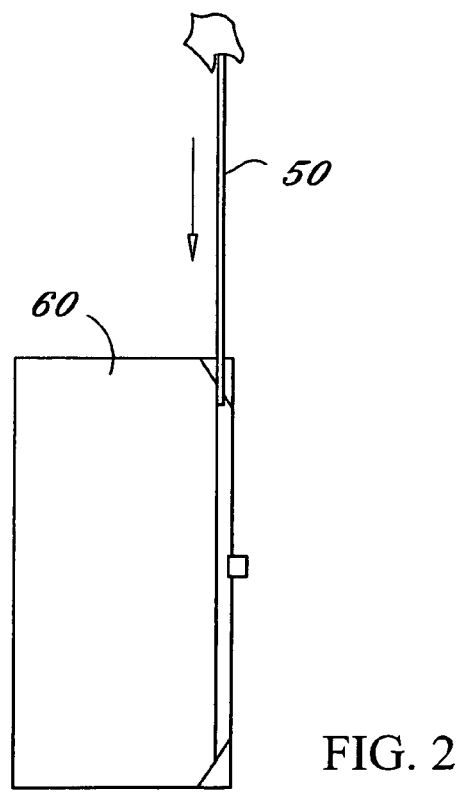
FIG. 2 depicts the insertion of a top support pole into the projection screen of the present invention.
Figure 3:
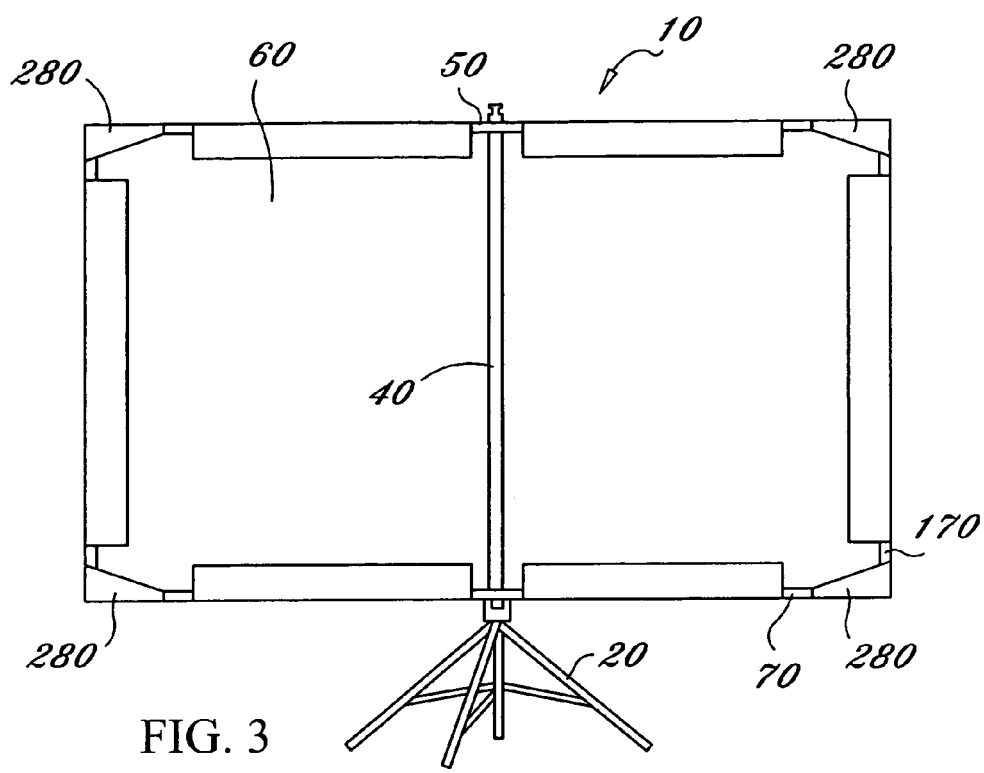
FIG. 3 is a rear view of a preferred embodiment of the projection screen in an operative position.
Figure 4:
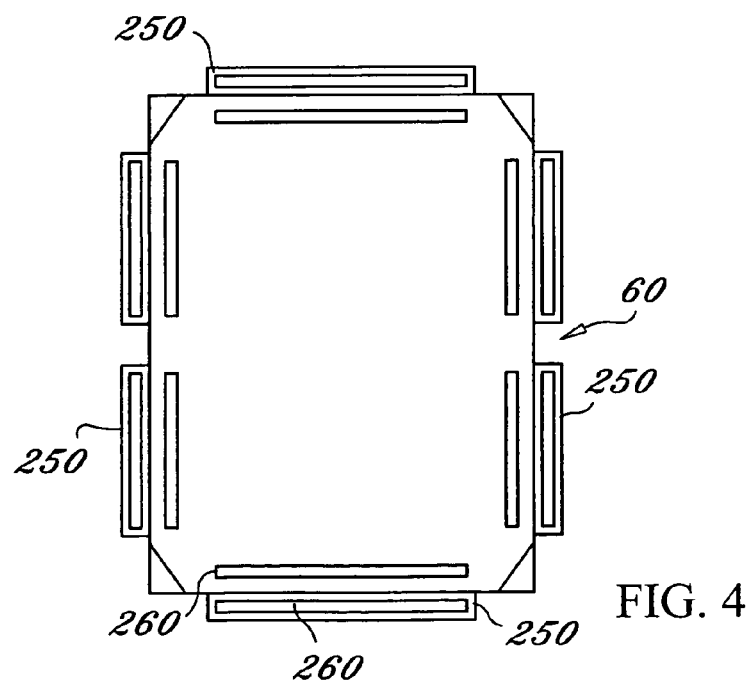
FIG. 4 is a preferred embodiment of the fully opened screen of the present invention.
Figure 5:
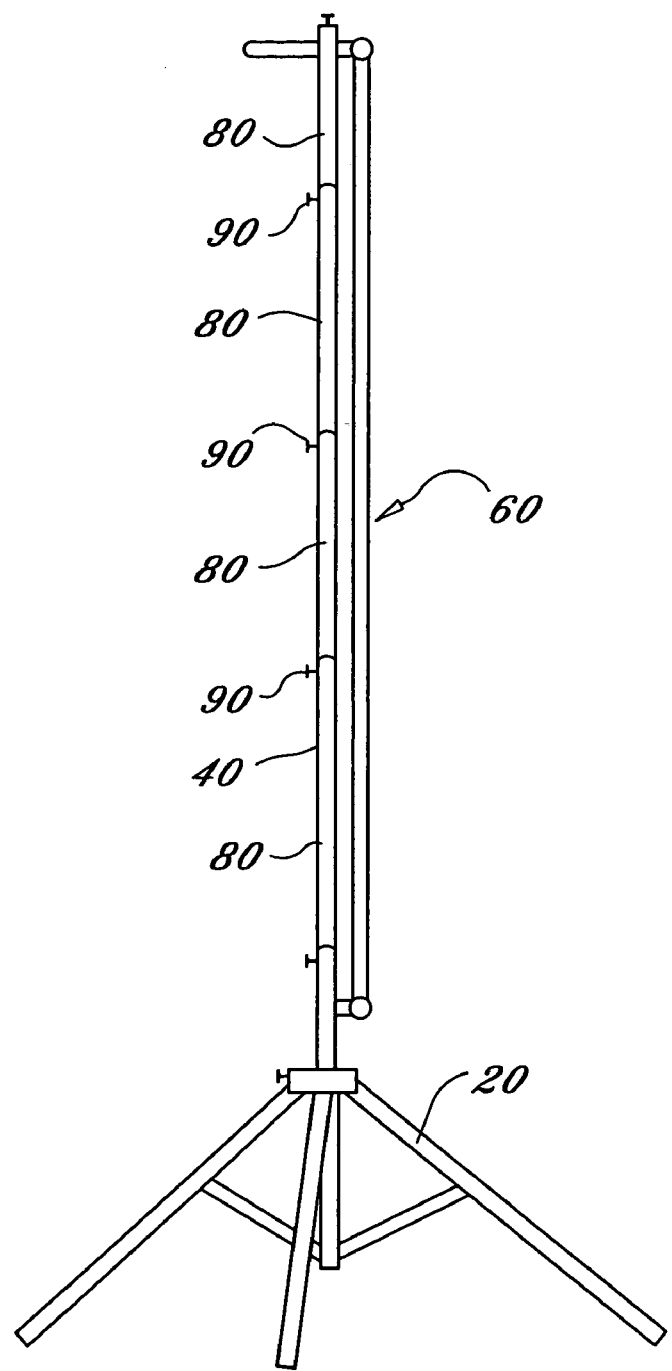
FIG. 5 is a side view of the portable screen assembly of the present invention.
Figure 6:
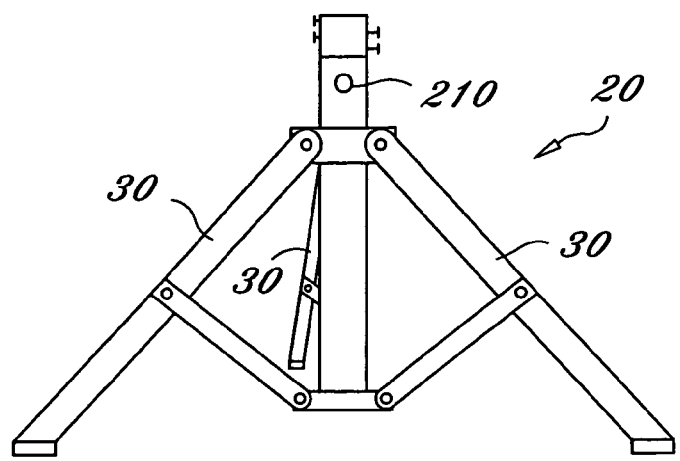
FIG. 6 is a front view of the fully opened base of the support stand of the present invention.
Figure 7:
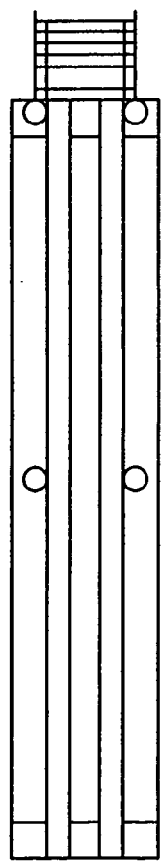
FIG. 7 is a view of a preferred embodiment of the collapsed central support pole of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

In a preferred embodiment, the present invention is a portable screen assembly 10 having a base 20 with at least three leg members 30 hingedly attached to a central support pole 40. The leg members 30 are selectively outwardly pivotable to form a base of support. The bottom of the central support pole 40 optionally rests on the ground, or in the same plane as the bottom ends of the leg members 30, for additional support.

A top frame member 50 perpendicularly removably attached to a top end of the central support pole 40 for supporting a top side of a screen 60. A bottom frame member 70 is perpendicularly attached to a bottom support portion of the central support pole 40 for supporting a bottom side of such a screen 60. The screen 60 is at least substantially removably attached to the frame members 50 and 70, meaning it is either completely removable, or is removable from most of the frame members 50 and 70 even if it remains permanently attached to a small portion of such elements.

The central support pole 40 is preferably comprised of at least two parallel rod elements 80 which are operatively connected to each other for longitudinal telescoping relative to each other to permit extension and retraction.

The rod elements 80 preferably comprise a securing mechanism 90 for securing the rod elements 80 in an extended position. The lower portion of the central support pole 40 is fixedly mounted to the base 20.

The top end of the central support pole 40 preferably comprises a mounting mechanism 100 for mounting the top frame member 50 to the top end of the central support pole 40. In a preferred embodiment, the top end of the central support pole 40 comprises a top cap 110 attached to the central support pole 40. The mounting mechanism 100 comprises an opening 120 in the top cap 110 for receiving a top frame member insert 130.

Figure 8:
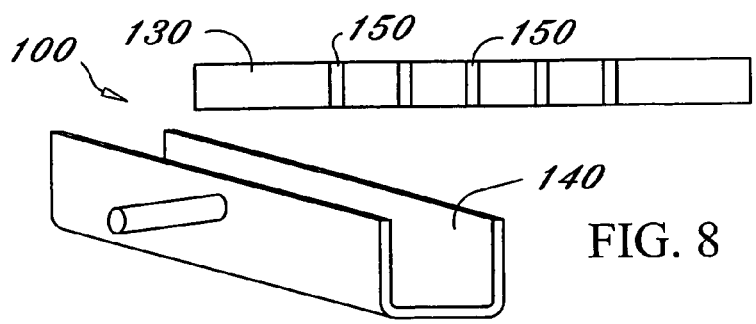
FIG. 8 is a view of a preferred embodiment of the unassembled keystoning device for attaching the top frame member to the central support pole.
Figure 9:
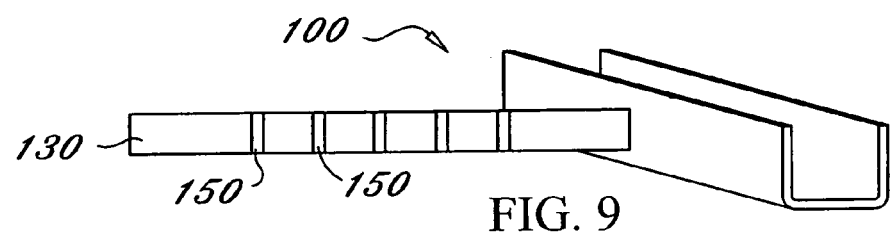
FIG. 9 is a perspective view of the assembled keystoning device of one embodiment of the present invention.

In one embodiment, shown in FIGS. 8 and 9, the mounting mechanism 100 comprises a bracket for supporting the top frame member 50, a mounting insert 130 removably attached to the bracket 140 (with respect to FIGS. 8 and 9) and an opening 120 at the top end of the support pole 40 adapted to receive a portion of the mounting insert 130.

Figure 10:
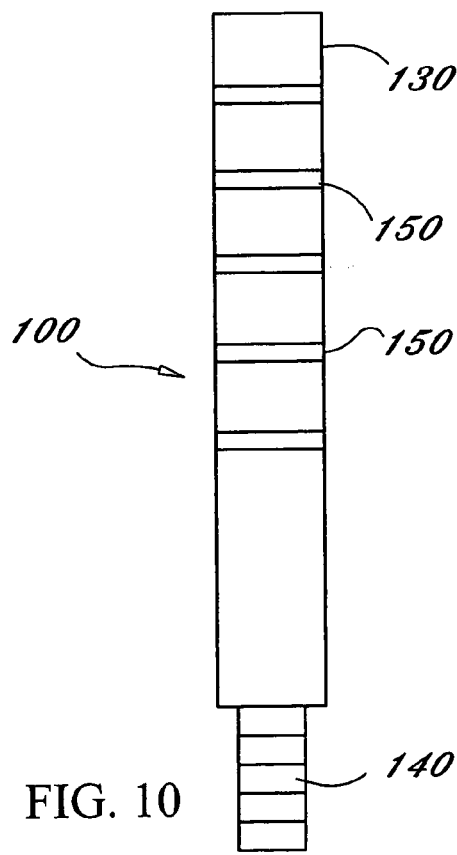
FIG. 10 is a view of another preferred embodiment of the keystoning device of the present invention.
Figure 11:
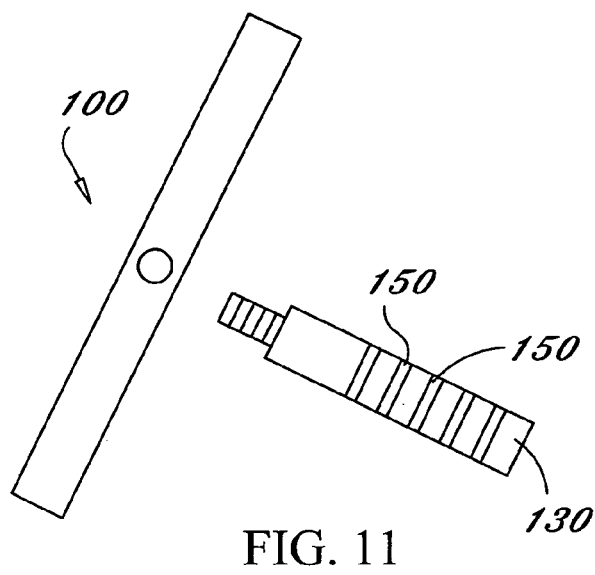
FIG. 11 is a top view of a preferred embodiment of the keystoning device of the present invention.
Figure 12:
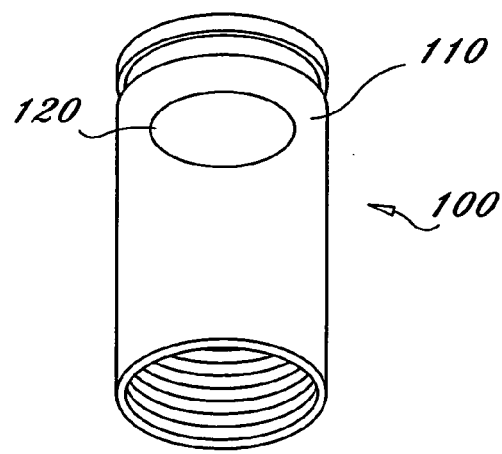
FIG. 12 is a perspective view of a preferred embodiment of the top cap of the present invention.
Figure 13:
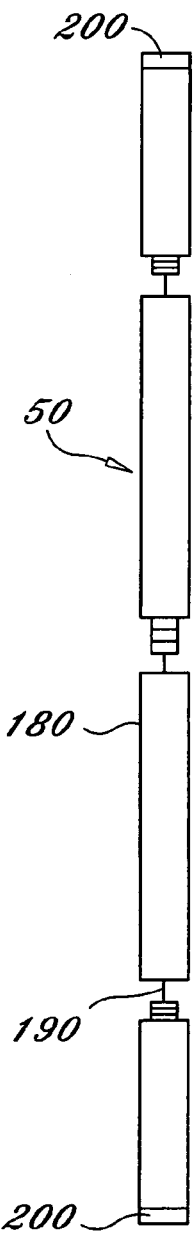
FIG. 13 is a preferred embodiment of the top frame member with segments attached via a central cord.
Figure 14:
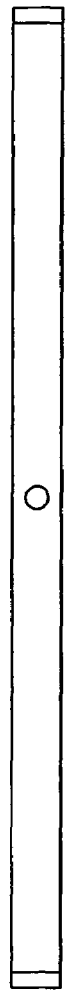
FIG. 14 is a preferred embodiment of the top frame member of the present invention.
Figure 15:
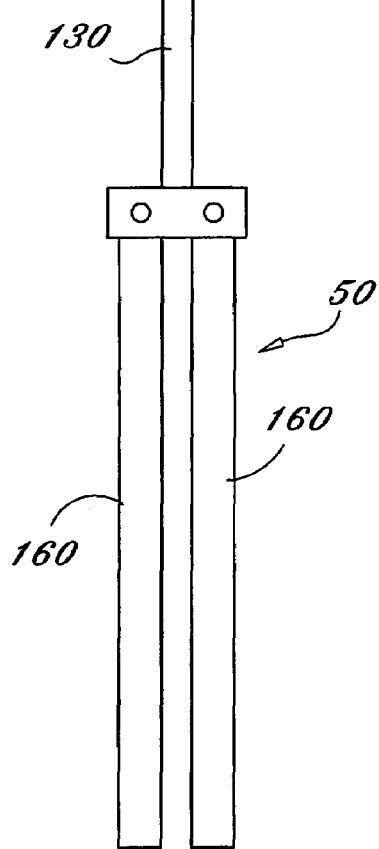
FIG. 15 is a preferred embodiment of the fully collapsed top frame member of the present invention.
Figure 16:
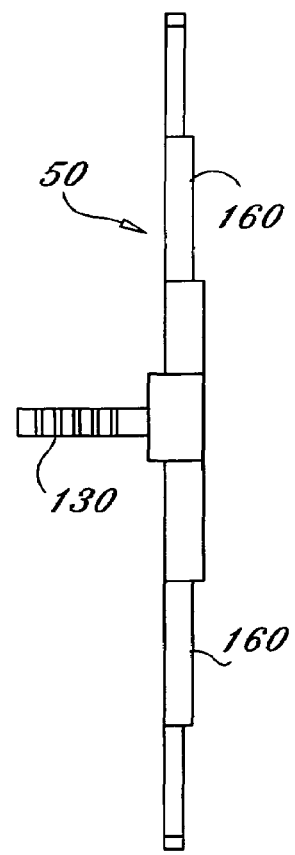
FIG. 16 is a preferred embodiment of the fully extended top frame member of the present invention.
Figure 17:
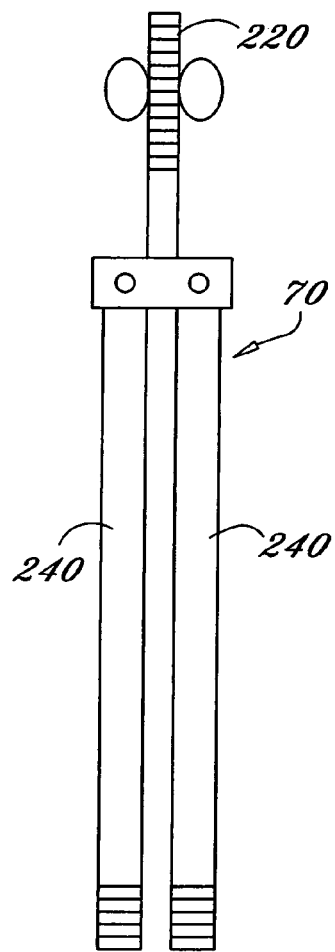
FIG. 17 is a preferred embodiment of the fully collapsed bottom frame member of the present invention.
Figure 18:
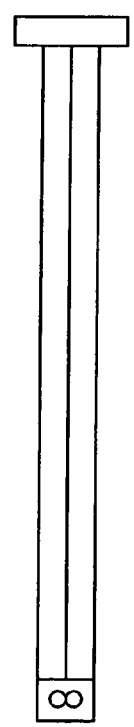
FIG. 18 is a preferred embodiment of a fully collapsed support rod of the present invention.
Figure 19:
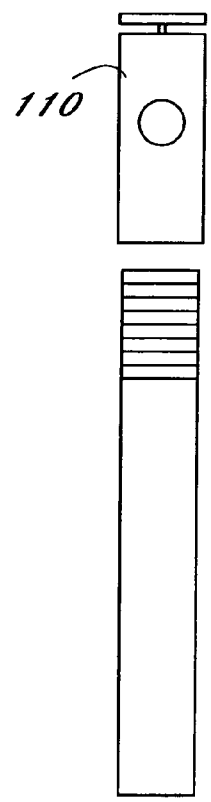
FIG. 19 is a front view of a preferred embodiment of the top cap of the present invention.
Figure 20:
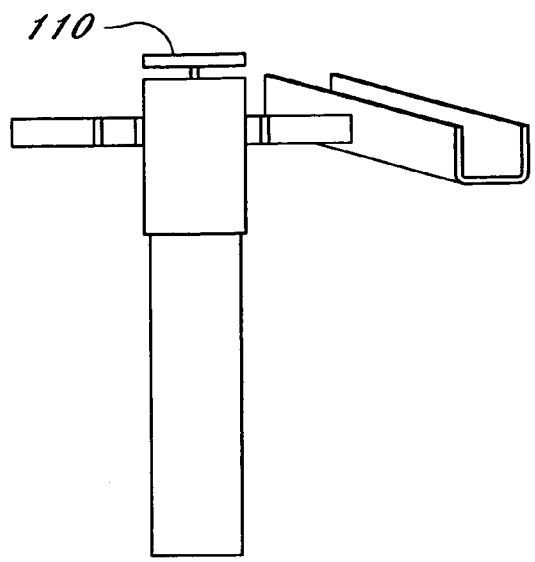
FIG. 20 is a preferred embodiment of the central support pole selectively engaged with the keystoning device of the present invention.
Figure 21:
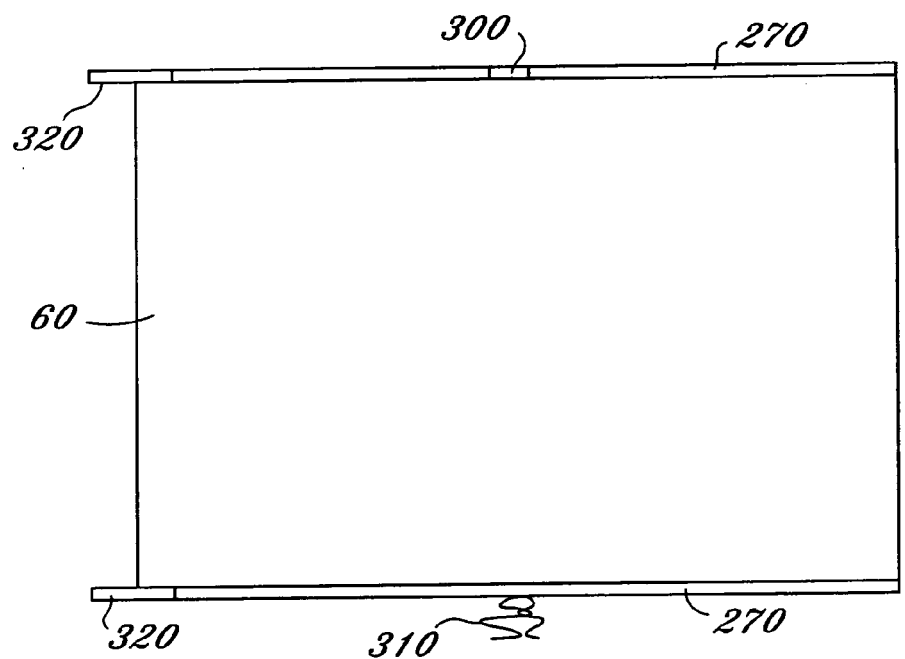
FIG. 21 is a front view of one embodiment of the screen of the present invention.
Figure 22:
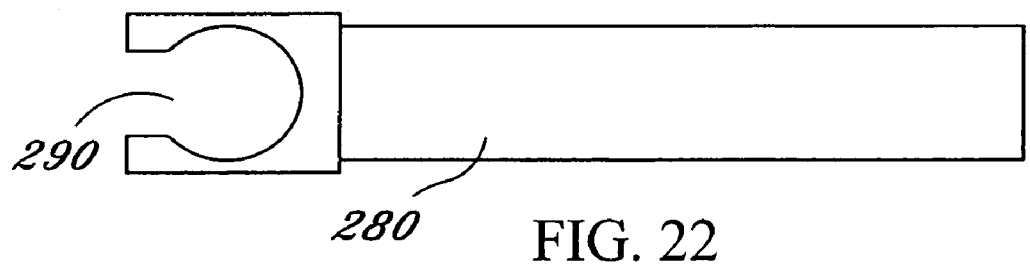
FIG. 22 is a side view of one embodiment of the mounting bracket of the present invention.
Figure 23:
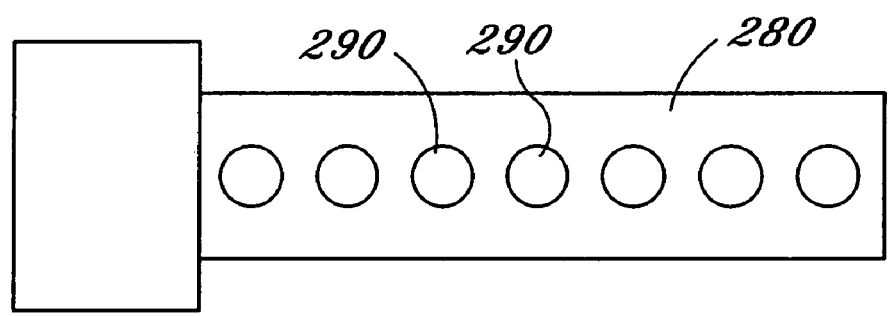
FIG. 23 is a bottom view of one embodiment of the mounting bracket of the present invention.

In another preferred embodiment, shown in FIG. 10, the mounting mechanism 100 comprises a mounting member 140 (with respect to FIG. 10), affixed to said top frame member 50, having at least one opening adapted to engage the top end of the central support pole 40. The mounting member 140 (with respect to FIG. 10), in one embodiment, comprises at least two openings adapted to engage the top end of the central support pole 40, such that the central support pole 40 can be selectively engaged by either of the openings to adjust the angular position of the screen 60.

In another preferred embodiment, the mounting mechanism 100 further comprises a mounting insert 130 having a plurality of notches 150 for selectively engaging a portion of the mounting mechanism 100. The insert 130 can be selectively adjusted into a forward or rearward position to adjust for keystoning purposes. The insert 130 is optionally removably mounted to the top frame member 50. Alternatively, the top frame member insert is pivotally connected to at least two telescopically extendable rods 160. The telescopically extending rods 160 are preferably collapsible and pivotally foldable toward one another in a direction substantially 180° away from the insert 130.

In another preferred embodiment, the device 10 further includes at least two side supports 170 disposed between respective ends of the top frame member 50 and the bottom frame member 70. Optionally, the side supports 170 comprise separable members or rods 180 which are frictionally fitted or threaded to one another. Preferably, they include a cord 190 running through the side supports 170 which prevents disassociation thereof via end stops 200 which may be knots in the cord or other suitable elements. Alternatively, the side supports 170 may include collapsible extendable rods which may pivot toward one another.

In another preferred embodiment of the present invention, the bottom end of the central support pole 40 comprises a bottom mounting mechanism for receiving a bottom frame member insert 220 for supporting the bottom frame member 70. Optionally, as an example of such a bottom mounting mechanism, a plurality of openings 210 are provided for selectively engaging the bottom frame member insert 220. The engagement between the insert 220 and the opening 210 can be any suitable form of engagement such as a frictional fit, threading, or a nut or wingnut retainer.

The bottom frame member 70 preferably includes an insert 220 which is pivotally connected to at least two telescopically extendable rods 240. The telescopically extending rods 240 are preferably collapsible and pivotally foldable toward one another in a direction substantially 180° away from the insert 220.

In a preferred embodiment, the screen 60 is detachably mounted to at least one of, preferably both of, the top frame member 50 and the bottom frame member 70 via flaps 250 in the screen 60. The flaps 250 loop around the frame members 50 and 70 and fasten via hook and loop fasteners 260. The same mechanism is optionally used to secure the screen 60 to the side supports 170.

In an alternate embodiment, the screen 60 is attached to the frame members 50 and 70 via sleeves 270 at top and bottom edges adapted to receive the top frame member 50 and the bottom frame member 70, respectively.

In either embodiment, the corners of the screen 60 optionally include pockets 280 to further support the frame members 50 and 70.

In another alternative embodiment, the screen 60 includes eyelets fixedly attached thereto at its edges and adapted to receive hooks disposed on at least one or both of the top frame member 50 and the bottom frame member 70.

The screen 60 is preferably composed of a wrinkle resistance material so that the screen may be stored and transported in a folded up configuration without causing permanent wrinkling. Suitable materials for the screen 60 may include "Spandex," a cotton polyester blend, a heavy duty cotton polyester mix, or ballistic nylon. However, any material which can be folded, and spread out substantially resistant of wrinkles and has a surface which allows typical projections to be readable is suitable for screen 60. The other elements of the device 10 are preferably durable and light weight. Aluminum, plastic, or other metal compositions are most suitable for these purposes.

In a further embodiment, the portable screen assembly 10, the top frame member 50 and the bottom frame member 70 are attached to the screen 60 via sleeves 270 in top and bottom edges of the screen 60. The top frame member 50 is mounted to the top end of the central support pole 40 via a top frame mounting bracket 280 which has a receiving portion 290 for receiving the top frame member 50. The bracket 280 includes at least one opening 290 adapted to receive and rest atop the top end of the central support pole 40. Preferably, the top frame mounting bracket 280 further comprises at least one additional opening 290 whereby the top end of the central support pole 40 selectively engages one of the openings 290 such that the angle of the screen 60 is adjustable. In one embodiment, the top sleeve 270 is interrupted by a gap 300 along a central portion of the top frame member 50 wherein the top frame mounting bracket 280 engages the top frame member 50 within said gap 300. Preferably, the bottom portion of the screen 60 is mounted to a bottom portion of the central support pole 40 via a retainer 310, which may be a string, tie, cord, or other suitable retaining device. The sleeves 270 optionally include at least one end flap 320 which retains the frame members 50 or 70 in place such as by hook and loop fasteners or other suitable fastening means.

The present invention also contemplates the method of manufacturing or assembling the portable screen of the invention. The method includes the steps of providing each of the above-mentioned elements and mounting them as detailed in the above description.

Most generally, the method of the present invention includes a method for manufacturing a portable screen assembly comprising providing a base having at least three leg members hingedly attached to a central support pole, wherein said leg members are selectively outwardly pivotable to form a base of support, removably attaching a top frame member perpendicularly removably attached to a top end of said central support pole for supporting a top side of a screen, removably attaching a bottom frame member perpendicularly attached to a bottom support portion of said central support pole for supporting a bottom side of such a screen, and removably attaching a screen which is substantially removably attached to said top frame member and said bottom frame member.

While the specific embodiments have been illustrated and described, numerous modifications come to mind without significantly departing from the spirit of the invention, and the scope of protection is only limited by the scope of the accompanying claims.

What is claimed is:

1. A portable screen assembly comprising:
    a base having at least three leg members hingedly attached to a central support pole, wherein said leg members are selectively outwardly pivotable to form a base of support,
    a top frame member perpendicularly removably attached to a top end of said central support pole for supporting a top side of a screen,
    a bottom frame member perpendicularly disposed with respect to a bottom support portion of said central support pole for supporting a bottom side of such a screen, and
    a screen which is substantially removably attached to said top frame member and said bottom frame member,
    further comprising a mounting mechanism for mounting said top frame member to the top end of said central support pole,
    wherein the top end of said central support pole comprises a top cap attached to said central support pole, and wherein said mounting mechanism comprises an opening in said top cap for receiving a top frame member insert.

2. A portable screen assembly comprising:
a base having at least three leg members hingedly attached to a central support pole, wherein said leg members are selectively outwardly pivotable to form a base of support,
a top frame member perpendicularly removably attached to a top end of said central support pole for supporting a top side of a screen,
a bottom frame member perpendicularly disposed with respect to a bottom support portion of said central support pole for supporting a bottom side of such a screen, and
a screen which is substantially removably attached to said top frame member and said bottom frame member,
further comprising a mounting mechanism for mounting said top frame member to the top end of said central support pole,
wherein said mounting mechanism comprises a bracket for supporting said top frame member, a mounting insert removably attached to said bracket and an opening at the top end of said support pole adapted to receive a portion of said mounting insert.

3. A portable screen assembly comprising:
a base having at least three leg members hingedly attached to a central support pole, wherein said leg members are selectively outwardly pivotable to form a base of support,
a top frame member perpendicularly removably attached to a top end of said central support pole for supporting a top side of a screen,
a bottom frame member perpendicularly disposed with respect to a bottom support portion of said central support pole for supporting a bottom side of such a screen, and
a screen which is substantially removably attached to said top frame member and said bottom frame member,
further comprising a mounting mechanism for mounting said top frame member to the top end of said central support pole,
wherein said mounting mechanism comprises a mounting member, affixed to said top frame member, having at least one opening adapted to engage the top end of said central support pole,
wherein said mounting member further comprises a second opening adapted to engage the top end of said central support pole, such that the central support pole can be selectively engaged by either of said openings to adjust the angular position of the screen.

4. A portable screen assembly comprising:
a base having at least three leg members hingedly attached to a central support pole, wherein said leg members are selectively outwardly pivotable to form a base of support,
a top frame member perpendicularly removably attached to a top end of said central support pole for supporting a top side of a screen,
a bottom frame member perpendicularly disposed with respect to a bottom support portion of said central support pole for supporting a bottom side of such a screen, and
a screen which is substantially removably attached to said top frame member and said bottom frame member,
further comprising a mounting mechanism for mounting said top frame member to the top end of said central support pole,
wherein said mounting mechanism further comprises a mounting insert having a plurality of notches for selectively engaging a portion of said mounting mechanism wherein said insert can be selectively adjusted into a forward or rearward position.

5. The portable screen assembly according to claim 4, wherein said mounting insert is removably mounted to said top frame member.

6. The portable screen assembly according to claim 4, wherein said top frame member insert is pivotally connected to at least two telescopically extendable rods.

7. The portable screen assembly according to claim 6, wherein said telescopically extending rods are collapsible and pivotally foldable toward one another in a direction substantially 180° away from said insert.

8. A portable screen assembly comprising:
a base having at least three leg members hingedly attached to a central support pole, wherein said leg members are selectively outwardly pivotable to form a base of support,
a top frame member perpendicularly removably attached to a top end of said central support pole for supporting a top side of a screen,
a bottom frame member perpendicularly disposed with respect to a bottom support portion of said central support pole for supporting a bottom side of such a screen, and
a screen which is substantially removably attached to said top frame member and said bottom frame member,
wherein said screen is detachably mounted to at least one of said top frame member and said bottom frame member via flaps in said screen, wherein said flaps loop around one of said frame members and fasten via hook and loop fasteners.

9. A portable screen assembly comprising:
a base having at least three leg members hingedly attached to a central support pole, wherein said leg members are selectively outwardly pivotable to form a base of support,
a top frame member perpendicularly removably attached to a top end of said central support pole for supporting a top side of a screen,
a bottom frame member perpendicularly disposed with respect to a bottom support portion of said central support pole for supporting a bottom side of such a screen, and
a screen which is substantially removably attached to said top frame member and said bottom frame member,
wherein said screen comprises sleeves at top and bottom edges adapted to receive said top frame member and said bottom frame member respectively.

* * * * *